United States Patent
Ibing et al.

[15] 3,697,541
[45] Oct. 10, 1972

[54] PROCESS FOR THE MANUFACTURE OF PYROMELLITIC ACID DIIMIDE

[72] Inventors: Günther Ibing, Gladbeck; Kurt Neubold, Bottrop, both of Germany

[73] Assignee: Scholven-Chemie Aktiengesellschaft

[22] Filed: June 30, 1969

[21] Appl. No.: 837,946

[30] Foreign Application Priority Data
July 10, 1968 Germany..........P 17 70 840.6

[52] U.S. Cl. .............................................260/326 C
[51] Int. Cl. .............................................C07d 27/52
[58] Field of Search ..................................260/326 C

[56] References Cited

UNITED STATES PATENTS 3,078,228    2/1963    Smith et al.............260/326 X

*Primary Examiner*—Alex Mazel
*Assistant Examiner*—Joseph A. Narcavage
*Attorney*—Burgess, Dinklage & Sprung

[57] ABSTRACT

Pyromellitic acid diimide is manufactured with yields of greater than 99 percent by the reaction of pyromellitic acid or its anhydride with formamide in an organic solvent at an elevated temperature of up to about 170°C and under an inert atmosphere.

7 Claims, No Drawings

PROCESS FOR THE MANUFACTURE OF PYROMELLITIC ACID DIIMIDE

PRIOR ART

A number of ways of manufacturing pyromellitic acid diimide have been disclosed. These consist in heating the tetraammonium salt of pyromellitic acid to above 200°C, in passing dry ammonia through pyromellitic acid dianhydride at 200°C, in heating pyromellitic acid tetraamide, in introducing ammonia into a solution of pyromellitic acid tetrachloride in benzene, and in the reaction of 2,5-dibromoterephthalic acid with copper(I) cyanide in dimethylformamide followed by treatment with a solution of iron(III) chloride in aqueous hydrochloric acid.

These methods of producing pyromellitic acid diimide have been unable to achieve any technical importance because the starting material, i.e., the pyromellitic acid tetraamide, the pyromellitic acid tetrachloride and the 2,5-dibromoterephthalic acid are difficult to prepare, or because the yields and the purity of the diimide are unsatisfactory. Furthermore, very long reaction times are necessary in the manufacture of pyromellitic acid diimide from the ammonium salts of pyromellitic acid.

THIS INVENTION

According to this invention, pyromellitic acid diimide of high purity can be readily produced in high yields from technically easily accessible starting materials, i.e., pyromellitic acid or its anhydride is reacted with formamide in a solvent at an elevated temperature in a straight-forward manner.

Pyromellitic acid or its anhydride are equally usable as starting materials. The formamide, in a slight excess above the theoretical quantity, is reacted in a suitable organic solvent with the pyromellitic acid dianhydride or pyromellitic acid at elevated temperatures and in an inert atmosphere. The best solvent for this purpose in N-methylpyrrolidone.

However, formamide itself, and dimethylformamide, are also usable, though not to the same advantage. In order to achieve a complete reaction of pyromellitic acid dianhydride or pyromellitic acid, it is desirable to use from 1 to 10 percent more formamide (unless it serves as the solvent) than the theoretical quantity. It has also proven advantageous for the performance of the reaction to use for each weight-part of pyromellitic acid dianhydride or pyromellitic acid from 2.5 to 4.0, preferably 3.0 to 3.5, parts by weight of the mixture of formamide plus solvent, or of the solvent mother liquor, as the case may be. The reaction temperatures should not exceed 170°C and can range between 120° and 170°C, preferably between 150° and 165°C. Reaction times of 1 to 1.5 hours are sufficient. To prevent side reactions it is desirable to operate in a nitrogen atmosphere. A portion of the water of reaction and small amounts of formic acid distill out during the reaction.

One important feature of the invention is the reuse of the solvent mother liquors. After the pyromellitic acid diimide has been precipitated and removed from the cooled reaction mixture, the solvent mother liquor is reconstituted with the necessary amount of formamide and fresh solvent and is used without further post-treatment for the next batch. In this manner, yields of better than 99 percent based on the pyromellitic acid dianhydride or pyromellitic acid, and of better than 90 percent based on the formamide, are achieved. Only when formamide itself is used as the solvent are the yields substantially poorer with reference to the formamide. The crude product is washed with a large amount of water to remove the adhering solvent, and dried. The pure diimide thus prepared exhibits a nitrogen value nearly equal to the theoretical.

Pyromellitic acid diimide is a valuable product for the preparation of other pyromellitic acid derivatives, such as pyromellitic acid diamide, pyromellitic acid tetraamide, pyromellitic acid dinitrile and bis-(N-hydroxymethyl)-pyromellitic acid diimide.

EXAMPLES

Example I

In a flask provided with a stirrer, gas line, thermometer, and a fractionating column with a descending condenser, 100 g of pyromellitic acid anhydride (PMDA) is suspended with stirring in 262 ml of N-methylpyrrolidone, and 43.4 g of formamide (105 percent of the theoretical amount) is added. The mixture is heated while a gentle flow of nitrogen is passed over it. The reaction begins at about 120°C with a moderate release of gas. The temperature is raised to 160°C and the reaction mixture is kept at this temperature for 30 minutes. Then it is cooled to room temperature and the precipitated pyromellitic acid diimide (PMDI) is filtered out. 43.4 g of formamide is added to the N-methylpyrrolidone mother liquor, and more N-methylpyrrolidone is added to restore the mixture to the above starting volume, and it is used again for the reaction of 100 g of pyromellitic acid dianhydride (PMDA). In this manner, the mother liquor is reused 9 times. As the use of the mother liquor progresses, small quantities of the water of reaction and of formic acid distill out at the reaction temperature of 160°C.

The results are shown in Table I. The amounts of pyromellitic acid dianhydride, formamide and fresh N-methylpyrrolidone used in each batch and the yields of pure pyromellitic acid diimide are given. The average yield for all batches was 99.3 percent pyromellitic acid diimide with reference to the pyromellitic acid dianhydride input, and 94.5 percent with reference to the formamide input, achieved for an average diimide nitrogen content of 12.86 percent. It is to be noted that the nine-time reuse of the mother liquor is not a limit. It can be reused as often as desired.

TABLE I

| Batch | PMDA, g. | Formamide, g. | N-methyl pyrrolidone, ml. | Total yield, g. | Yields of PMDI Percent of theory w. ref. to PMDA | Percent of theory w. ref. to formamide | Nitrogen content, percent |
|---|---|---|---|---|---|---|---|
| 1 | 100 | 43.4 | 262 | 87.9 | 88.7 | 84.4 | 12.90 |
| 2 | 100 | 43.4 | 34 | 100.3 | 101.2 | 96.3 | 12.84 |
| 3 | 100 | 43.4 | 30 | 98.5 | 99.4 | 94.6 | 12.92 |
| 4 | 100 | 43.4 | 40 | 101.8 | 102.7 | 97.7 | 12.78 |
| 5 | 100 | 43.4 | 33 | 99.9 | 100.8 | 95.9 | 13.00 |
| 6 | 100 | 43.4 | 41 | 98.9 | 99.8 | 94.9 | 12.60 |
| 7 | 100 | 43.4 | 38 | 100.5 | 101.4 | 96.5 | 12.70 |
| 8 | 100 | 43.4 | 39 | 99.1 | 100.0 | 95.1 | 12.88 |
| 9 | 100 | 43.4 | 40 | 98.8 | 99.7 | 94.9 | 12.90 |
| 10 | 100 | 43.4 | 37 | 98.7 | 99.6 | 94.8 | 12.85 |
| | 1,000 | 434.0 | 605 | 984.4 | ⌀99.3 | 94.5 | 12.86 |

Example II

In the same manner as in Example 1, 116.5 g of pyromellitic acid (PMS) in 315 ml of N-methylpyrrolidone was reacted with 43.4 g of formamide. The mother liquor of this batch is reconstituted and reused for the next batch as described above, and this reuse is repeated 9 times.

The data on this experimental series are given in Table II. The average yield of pyromellitic acid diimide for all batches was 99.1 percent with reference to the PMS input, and 94.3 percent with reference to the formamide input, achieved with an average nitrogen content of 12.84 percent.

TABLE II

| Batch | Pyromellitic acid, g. | Formamide, g. | N-methyl pyrrolidone, ml. | Yields of PMDI | | | Nitrogen content, percent |
|---|---|---|---|---|---|---|---|
| | | | | Total yield, g. | Percent of theory w. ref. to PMS | Percent of theory w. ref. to formamide | |
| 1 | 116.5 | 43.4 | 315 | 88.7 | 89.5 | 85.1 | 12.91 |
| 2 | 116.5 | 43.4 | 45 | 101.4 | 102.3 | 97.3 | 12.85 |
| 3 | 116.5 | 43.4 | 43 | 98.3 | 99.2 | 94.4 | 12.92 |
| 4 | 116.5 | 43.4 | 47 | 102.2 | 103.1 | 98.1 | 12.87 |
| 5 | 116.5 | 43.4 | 43 | 98.0 | 98.9 | 94.1 | 12.81 |
| 6 | 116.5 | 43.4 | 44 | 98.9 | 99.8 | 94.9 | 12.79 |
| 7 | 116.5 | 43.4 | 44 | 98.4 | 99.3 | 94.5 | 12.88 |
| 8 | 116.5 | 43.4 | 47 | 99.6 | 100.5 | 95.6 | 12.85 |
| 9 | 116.5 | 43.4 | 41 | 98.5 | 99.4 | 94.6 | 12.78 |
| 10 | 116.5 | 43.4 | 49 | 98.3 | 99.2 | 94.4 | 12.77 |
| | 1,165.0 | 434.0 | 718 | 982.3 | φ99.1 | 94.3 | 12.84 |

Example III

In the same manner as in Example I, 100 g of pyromellitic acid dianhydride (PMDA) are reacted in 300 ml of formamide. The mother liquor of this batch is used for the next batch after reconstitution to 300 ml, and this reuse is repeated 9 times.

The data on this experimental series are shown in Table III. The average yield of pyromellitic acid diimide for all batches was 99.3 percent with reference to the pyromellitic dianhydride input, and 64.3 percent with reference to the formamide input, achieved with an average nitrogen content of 12.83 percent.

and pyromellitic acid dianhydride with formamide at a reaction temperature of about 120°–170°C, cooling the reaction mixture and recovering pyromellitic acid diimide therefrom.

2. The process of claim 1 wherein said reaction is carried out in a solvent for said formamide with said reaction mixture after removal of said pyromellitic acid diimide being reconstituted by the addition of further amounts of formamide and solvent and being reused, the amount of formamide being in the range of 1 to 10 percent more than the theoretical, and the amount of solvent plus formamide used being in the range of 2.5 to 4.0 parts by weight per part of said compound.

3. The process of claim 2 wherein the reaction is carried out with an organic solvent in an inert atmosphere at a temperature in the range of 150° to 165°C.

4. The process of claim 3 wherein said solvent is N-methylpyrrolidone.

5. The process of claim 1, wherein the amount of formamide is at least 1 percent more than the theoretical amount.

6. A process comprising reacting a compound selected from the group consisting of pyromellitic acid and pyromellitic acid dianhydride with formamide at a reaction temperature of about 120°–170°C.

TABLE III

| Batch | PMDA, g. | Mother liquor, ml. | Fresh formamide, ml. | Yield of PMDI | | | Nitrogen content, percent |
|---|---|---|---|---|---|---|---|
| | | | | Total yield, g. | Percent of theory w. ref. to PMDA | Percent of theory w. ref. to formamide | |
| 1 | 100 | | 300 | 92.7 | 93.5 | 11.3 | 12.91 |
| 2 | 100 | 254 | 46 | 102.4 | 103.4 | 81.8 | 12.84 |
| 3 | 100 | 250 | 50 | 100.4 | 101.3 | 73.8 | 12.78 |
| 4 | 100 | 249 | 51 | 98.4 | 99.3 | 70.9 | 12.89 |
| 5 | 100 | 252 | 48 | 98.2 | 99.1 | 75.2 | 12.77 |
| 6 | 100 | 245 | 55 | 97.7 | 98.6 | 65.3 | 12.79 |
| 7 | 100 | 248 | 52 | 98.6 | 99.5 | 69.7 | 12.85 |
| 8 | 100 | 251 | 49 | 98.4 | 99.3 | 73.8 | 12.90 |
| 9 | 100 | 242 | 58 | 98.5 | 99.4 | 62.4 | 12.77 |
| 10 | 100 | 238 | 62 | 98.6 | 99.5 | 58.5 | 12.84 |
| | 1,000 | 208 | 771 | 983.9 | φ99.3 | 64.3 | 12.83 |

We claim:

1. A process comprising reacting a compound selected from the group consisting of pyromellitic acid 7. The process of claim 6, wherein the amount of formamide is at least 1 percent more than the theoretical amount.

* * * * *